United States Patent [19]

Zengel et al.

[11] 3,897,498

[45] July 29, 1975

[54] PRODUCTION OF M- AND P-PHENYLENEDIAMINE

[75] Inventors: Hans-Georg Zengel, Kleinwallstadt; Manfred Bergfeld, Erlenbach, both of Germany

[73] Assignee: Akzo N. V., Arnhem, Netherlands

[22] Filed: Mar. 13, 1974

[21] Appl. No.: 450,675

[30] Foreign Application Priority Data

Mar. 19, 1973   Germany............................ 2313496

[52] U.S. Cl................................. 260/578; 260/578
[51] Int. Cl............................................... C07c 87/58
[58] Field of Search...................................... 260/578

[56] References Cited
UNITED STATES PATENTS

| | | | |
|---|---|---|---|
| 3,457,311 | 7/1969 | Tiefenthal et al............... | 260/578 X |
| 3,567,746 | 3/1971 | Shetty............................ | 260/578 X |
| 3,674,852 | 7/1972 | Averill et al................... | 260/578 |

*Primary Examiner*—Paul F. Shaver
*Attorney, Agent, or Firm*—Johnston, Keil, Thompson & Shurtleff

[57] ABSTRACT

A two-stage process for the production of m- or p-phenylenediamine by chlorinating a dilute aqueous mineral acid suspension of the corresponding initial iso- or tere-phthalamide reactant in a first stage, the dilution being sufficient to retain hydrogen chloride being formed substantially completely dissolved in the reaction mixture, and then converting the N,N'-dichloro-isophthalamide or N,N'-dichloro-terephthalamide intermediate product into the corresponding m- or p-phenylenediamine in a second stage by reaction with an aqueous solution of an alkali or alkaline earth metal hydroxide. The diamine products are of known utility, especially as intermediates in the synthesis of azo dyes.

10 Claims, No Drawings

PRODUCTION OF M- AND P-PHENYLENEDIAMINE

One method of preparing meta- or para-phenylenediamine has already been disclosed in our earlier copending application, Ser. No. 344,579, filed Mar. 26, 1973, which provides a more detailed discussion of the art-recognized processes for the technical or commercial production of both of these useful diamines. Thus, the most common procedure has been to reduce meta- or para-nitroaniline with a combination of iron and hydrochloric acid, usually starting from benzene or chlorobenzene which must first be subjected to nitration prior to reduction with non/hydrochloric acid. These common procedures are relatively complex and costly without offering more than a moderate yield based upon the least expensive initial aromatic reactant.

In our earlier copending application, Ser. No. 344,579, we have described a new process in which isophthalamide or terephthalamide is converted into the corresponding m- or p-phenylenediamine by the so-called Hofmann reaction, which is to be understood as a reaction of a carboxylic acid amide with a hypochlorite or hypobromite to obtain a primary amine having one less carbon atom. See Wallis and Lane, Organic Reactions, Vol. 3, pages 267 ff. (1946); and Franzen, Chem. Ztg., Vol. 80 pages 8ff. (1956). For the production of the p-phenylenediamine, the Hofmann reaction sequence has been indicated as follows:

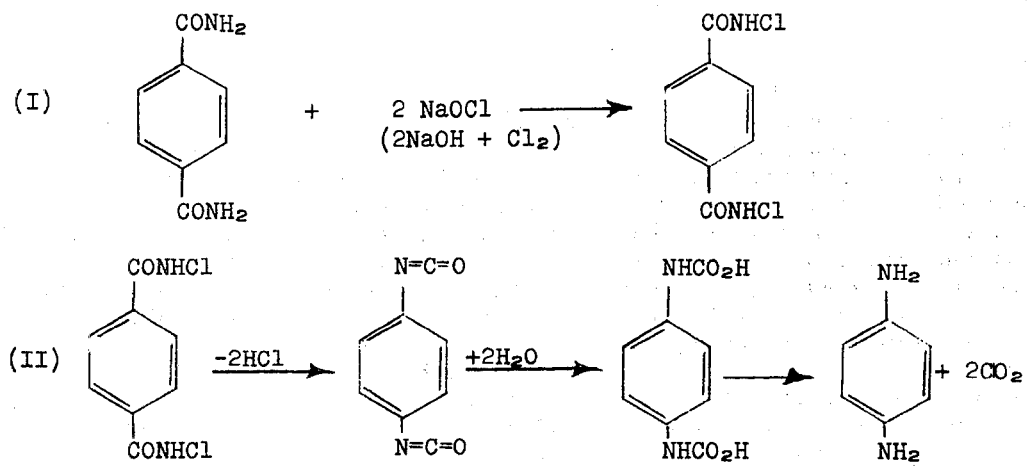

In carrying out this reaction according to our copending application, an aqueous suspension of the diamide can be reacted with a separately prepared hypohalite solution or the halogen may be conducted into an aqueous alkali or alkaline earth metal hydroxide solution in which the diamide is suspended. However, it is also possible to combine the diamide with only half of the stoichiometrically required amount of the alkaline solution, then introduce the halogen and finally add the rest of the alkaline solution after completion of the halogenation. In accordance with the Hofmann reaction sequence above, a single hydrogen atom of each amido group is first replaced by the halogen atom. The resulting acid N-haloamide, sometimes referred to as the N-halogenamide, then reacts with alkali to form an unstable salt, the anion of which splits off a halogen atom. This results in the formation of an intermediate product which is rearranged into the corresponding isocyanate. The isocyanate in turn is converted into the amine by the action of the alkali hydroxide.

With our prior method, the formation of the diamine from the diamide essentially takes place in a single stage or "one pot" reaction wherein it is never possible to isolate a unitary intermediate product. In the first phase (I) of the Hofmann reaction, wherein the formation of the N-halogenamide or its alkali or alkaline earth metal salt occurs, there is present a heterogeneous mixture of hypohalite, unreacted diamide and also monohalogen-diamide, dihalogen-diamide and their salts. At this point, however, the second phase (II) of the Hofmann reaction has already started, i.e. the rearrangement of the halogenated intermediate compounds to the amine or diamine. The amines are still exposed at this time to the attack of the hypohalite. Such conditions can be extremely disadvantageous for two reasons. First, the hypohalite is consumed so that it is not available to complete the halogenation of the unreacted or only partly reacted diamide, thereby causing a loss of diamine yield. Second, there are formed some undesirable, colored oxidation products, e.g. quinone-diimine, which cause a substantial reduction of both quality and yield of the diamine. The crude m- and p-phenylenediamine obtained by the process of our copending application generally appears as a grayish to dark brown hygroscopic material which smells strongly of the halogen (chlorine or bromine). This product must be purified.

One object of the present invention is to provide a new and improved process for the production of m- or p-phenylenediamine from the corresponding isophthalamide or terephthalamide, whereby higher yields and a pure diamine product are more readily assured. Another object of the invention is to carry out the preparation of the m- or p-phenylenediamine from its initial phthalamide reactant in two more distinctive and therefore more easily controlled stages, preferably with isolation or separation of an intermediate product from a first stage before carrying out the second stage. It is also an object to provide a more economical process and a much simpler recovery of the final pure product. These and other objects and advantages of the invention will become more apparent upon consideration of the following detailed specification.

It has now been found that it is possible to produce m- or p-phenylenediamine from the initial iso- or terephthalamide reactant in a much more satisfactory manner by (1) reacting chlorine with said phthalamide reactant suspended in water in a first stage while maintaining the resulting reaction mixture over the course of the reaction in said first stage as a dilute aqueous solution of a mineral acid, the dilution being such that hydrogen chloride being formed by the chlorination reaction remains substantially completely dissolved in the reaction mixture; and (2) converting the resulting N,N'-dichloro-isophthalamide or N,N'-dichloro-terephthalamide of said first stage into the corresponding m-phenylenediamine or p-phenylenediamine by reaction with an aqueous solution of an alkali or alkaline earth metal hydroxide in a second stage.

The N,N'-dichloro-isophthalamide or N,N'-dichloroterephthalamide obtained as an intermediate product from the first stage is preferably first separated from the reaction mixture and only then reacted in the second stage with the alkali or alkaline earth metal hydroxide.

The two stages of the process according to the present invention may be represented as follows:

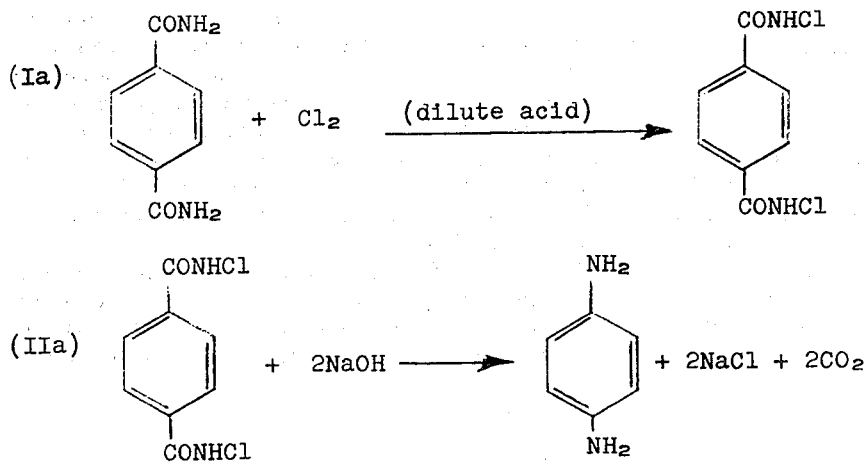

sulfuric acid, phosphoric acid or mixtures thereof.

The reaction for the first stage (Ia) is advantageously initiated with a mixture consisting essentially of a neutral aqueous suspension of the iso- or terephthalamide reactant, whereby the hydrogen chloride formed as a by-product of the chlorination reaction becomes completely dissolved in the reaction mixture and the reaction then proceeds in the resulting dilute aqueous hydrochloric acid medium. It is otherwise preferable to proceed from an initial dilute hydrochloric acid or a dilute sulfuric acid aqueous suspension of the initial phthalamide reactant.

The yield and the rate of chlorination in the first stage (Ia) of the process of the invention depend strongly on the acid concentration in the reaction mixture. Since the acid concentration of the reaction mixture or aqueous medium increases regularly as the chlorination progresses due to the release of hydrogen chloride, the rate of chlorination is retarded as the reaction comes closer to completion. Thus, if one proceeds from a strongly concentrated acid medium, e.g. from a 50% by weight sulfuric acid or from a 25% by weight hydrochloric acid solution, only slight yields are achieved. In even more concentrated hydrochloric or sulfuric acid initial reaction mixtures, there is practically no reaction.

The N,N'-dichloro-terephthalamide compound produced in the first stage (Ia) is a new compound. The corresponding N,N'-dichloro-isophthalamide has already been described in U.S. Pat. No. 3,105,848 wherein it is prepared by chlorinating isophthalamide in nitrobenzene and in the presence of sodium carbonate with yields of only about 3.5% of theory. This same process does not yield the N,N'-dichloro-terephthalamide product from the corresponding terephthalamide reactant.

It was surprising to discover that both of the N,N'-dichloro-iso- and -terephthalamide products could be produced and isolated in high and pure yields and in shorter reaction times by the process of stage (Ia), i.e. by carrying out a chlorination in a dilute aqueous mineral acid medium in the absence of an inert organic solvents and also in the absence of an acid acceptor such as sodium carbonate. This specific process is disclosed and claimed together with the new compound in our copending application (A3GW3 1677) being filed concurrently herewith.

It was even more surprising that the relatively stable intermediates, i.e. the pure N,N'-dichloro-diamide could then be immediately converted into the corresponding m- or p-phenylenediamine by treatment with the hydroxide in accordance with stage (IIa) of the present invention. This reaction proceeds very readily even at room temperature in a colorless solution to obtain the diamine product in an extraordinarily pure form and with surprisingly good stability. The present invention is essentially directed to the overall process which may be carried out in two stages with or without separation of the intermediate product.

As the aqueous mineral acid medium, it is preferable to use a dilute aqueous solution of hydrochloric acid, Moreover, if the acid concentration in the first stage reaction exceeds a certain maximum value during the course of the chlorination, the reaction is rapidly retarded. This maximum value of the acid concentration, which one should not exceed, is specific for each mineral acid and it also depends upon the reaction temperature and reaction pressure. It has been found, in fact, that this maximum value is reached when the hydrogen chloride arising in the course of the chlorination can no longer be completely dissolved in the reaction mixture, i.e. when the saturation concentration of the hydrogen chloride in the reaction mixture is exceeded under the given reaction conditions. These saturation concentrations can be easily determined for various reaction conditions by routine experimentation.

Since the amount of hydrogen chloride being released as a by-product in the reaction may be calculated directly from the amount of the initially introduced phthalamide reactant, it is preferable to select an initial dilution of the reaction mixture which is sufficiently low to avoid exceeding the saturation concentration of hydrogen chloride at the end of the reaction. However, it will be evident that the reaction mixture can also be further diluted during the course of the reaction by adding water or a dilute mineral acid.

The chlorination of both terephthalamide and isophthalamide proceeds exothermically, i.e. with heat being generated by the reaction itself. In general, the reaction is preferably carried out in accordance with the invention at temperatures or about 0°C to 100°C. The use of higher temperatures is disadvantageous insofar as noticeable amounts of terephthalic acid or isophthalic acid are formed by hydrolysis under these conditions. For economical reasons, the chlorination is preferably carried out at about 0° to 60°C., the heat of reaction being easily removed by water cooling or by cooling with other fluid heat transfer media.

The chlorination can be carried out at normal (atmospheric) pressure or at higher pressures. With increasing chlorine pressures, the required reaction time decreases, but the chlorine pressure range of between about 1 and 20 atm. is preferred for economical reasons. Either a liquid or gaseous chlorine may be used depending upon the chosen conditions of pressure and temperature.

Since the chlorination reaction according to the invention is a process carried out in a heterogeneous phase, good mixing of the suspension is desirably provided. The dilution of the reaction mixture should at least be regulated such that it can be stirred without difficulties or otherwise thoroughly mixed. The preferred dilution or proportion of the initial phthalamide reactant is about 20 to 400 grams of amide per liter of water or aqueous mineral acid, i.e. an amount corresponding to a concentration of approximately 0.1 to 2.5 mols of phthalamide reactant per liter of water or aqueous mineral acid.

By following the cited process conditions, the first stage chlorination can be completed after about 2 to 60 minutes. The initial phthalamide is practically quantitatively converted into the corresponding N,N'-dichloroterephthalamide or N,N'-dichloroisophthalamide without any intermediate formation of a solution. The suspension present at the end of the chlorination contains as solids substantially only the desired product. This solid product can be separated and recovered in the easiest possible manner, for example by simple filtration or centrifuging. After washing, e.g. with cold water, and then drying, e.g. at approximately 70°C. under vacuum, the product can be obtained in very pure form.

The N,N'-dichloro-terephthalamide produced in this first stage is a colorless, microcrystalline substance, turning light gray and sintering slightly at 250°C. and tending to sublime at 300°C. It is moderately soluble in polar organic solvents, e.g. in dioxane, dimethylacetamide, dimethylformamide and hexamethylphosphoric acid triamide. N,N'-dichloro-terephthalamide can be maintained in a darkened container for a practically unlimited period of time. At room temperature, it is a mild oxidation agent. By reason of its outstanding stability, it can be advantageously used for example in place of the less stable antiseptic agent Chloramin T (Sodium-N-chloro-p-toluenesulfonamide).

N,N'-dichloro-isophthalamide is a known compound and both it and the isomeric N,N'-dichloroterephthalamide represent valuable intermediate compounds. They may be converted into substituted ureas by reaction with amines, such ureas being used as herbicides and pesticides. Both intermediate products of the invention also have the utility described for N,N'-dichloroisophthalamide in said U.S. Pat. No. 3,105,843 (Example 3 and col. 6, lines 38–42). However, it is of special advantage that these intermediates can be used in the second stage of the present invention to obtain meta- or para-phenylenediamine which have a known utility as described in Kirk-Othmer, Encyclopedia of Chemical Technology, 2nd Edition Vol. 15, pages 222–223.

In the second stage (IIa) of the invention, the N,N'-dichloro-isophthalamide or N,N'-dichloro-terephthalamide is converted into the corresponding meta- or para-phenylenediamine with an alkali or alkaline earth metal hydroxide. This reaction is preferably carried out by dissolving or suspending the N,N'-dichloro-diamide reactant in an alkaline medium, which preferably consists essentially of the aqueous hydroxide solution, and then heating at relatively moderate temperatures. All alkali and alkaline earth metal hydroxides are suitable, but for economical reasons, sodium and calcium hydroxide are most advantageous. Potassium hydroxide may also be used, e.g. alone or in admixture with sodium or calcium hydroxide.

The hydroxide is preferably employed in a stoichiometric amount. It is neither necessary nor advantageous to use an excess of hydroxide.

The reaction of the N,N'-dichloro-diamide in the alkaline hydroxide medium preferably takes place at temperatures within a range of about 20° to 95°C., especially about 30° to 80°C. In the rearrangement reaction of stage (IIa) of the invention, it is feasible to use even lower temperatures and higher concentrations than is possible in our prior copending application, Ser. No. 344,579. The rearrangement is preferably initiated with a 5 to 45% by weight solution or suspension of the N,N'-dichloro-diamide.

The isolation of the diamine product from the reaction mixture can be accomplished by extraction with chloroform, 1,2-dichloroethane or another suitable organic solvent. The relative solubilities of these diamine products can be easily determined, if not already known, for various extraction solvents. The diamine accrues in the reaction mixture with such a high degree of purity that it can also be separated by fractional crystallization with very good yields. Other methods of separation are also feasible, for example by precipitation of the amine in salt form with sulfuric acid or hydrochloric acid.

The rearrangement or second stage reaction is strongly exothermic and is preferably carried out under adiabatic conditions. With high initial concentrations of N,N'-dichloro-terephthalamide, where an adiabatic procedure may not be possible on account of an excessively large heat development, the reaction can be carried out under evaporative cooling (e.g. with methylene chloride as the vaporizing medium).

The process of the present invention represents an improvement over our own earlier process of copending application, Ser. No. 344,579, for the following reasons:

First of all, the earlier process requires at least 4 equivalents of hydroxide per amide group for the formation of the hypohalite and the splitting or cleavage of the isocyanate, i.e. at least 8 molar equivalents of hydroxide per mol of iso-or terephthalamide reactant. However, since the selectivity with reference to the diamine formation is most favorable with an excess of hydroxide, the earlier process of our copending application, Ser. No. 344,579, preferably uses a molar ratio of hydroxide : phthalamide of about 9:1 to 10:1. In the overall process of the present invention, there is theoretically required only 6 molar equivalents of hydroxide per mol of the diamide or actually the N,N'-dichloro-diamide. Moreover, it has been found that this stoichiometric molar ratio already represents the optimum selectivity in producing the diamine so that for reasons of selectivity alone, it is especially preferred to use a molar ratio of hydroxide to N,N'-dichlorodiamide of approximately 6:1. At the same time, this ratio also represents an improvement for economical reasons.

Apart from these considerations, the process of the present invention provides higher yields, permits the use of more concentrated reactants and is therefore well adapted to the large scale industrial production of the m- and p-phenylenediamine products.

In addition the reaction mixture is more easily worked up for isolation of the diamine product which is obtained in a purer and more stable form.

The first eight examples which follow illustrate the first stage of the process of the invention for the preparation of the intermediate N,N'-dichloro-isophthalamide and N,N'-dichloroterephthalamide compounds. The invention is not intended as being directed to these examples alone but in combination with the succeeding examples to complete the overall process.

EXAMPLE 1

540 grams (3.29 mols) of terephthalamide were suspended in 10 liters of water. 4 grams of chlorine per minute were conducted into this suspension over a 2 hour period while intensively mixing. Through slight cooling, the reaction temperature was maintained at 25°C. The pressure amounted to 1.0 atm. Thereafter, the reaction mixture was filtered, and the residue was washed with 2 liters of cold water and dried at 70°C. under vacuum. A colorless N,N'-dichloro-terephthalamide was obtained in an amount of 755 grams (98.4% of theory).

EXAMPLE 2

32 grams (0.195 mols) of terephthalamide were suspended in 0.6 liters of a 17% by weight aqueous hydrochloric acid solution in a glass autoclave. 33 grams of chlorine were then introduced at 6 atm. with mixing and cooling at 25°C. After eight minutes, a constant pressure was attained in the autoclave and the reaction was terminated. The reaction mixture was worked up as in Example 1. The yield of pure N,N'-dichloro-terephthalamide amounted to 44.2 grams (97.2% of theory).

EXAMPLE 3

1200 grams (7.317 mols) of terephthalamide were suspended in 7 liters of a 17% by weight aqueous hydrochloric acid solution. Into this suspension at 25°C. and over a period of 30 minutes, 1100 grams of chlorine were introduced in such a manner that the pressure was held constant at 6 atm. The reaction mixture was then worked up as in Example 1. The yield of N,N'-dichloro-terephthalamide amounted to 1690 grams (99.1% of theory).

EXAMPLE 4

Into a suspension of 400 grams (2.439 mols) of terephthalamide in one liter of a 17% by wt. aqueous hydrochloric acid solution there was introduced 360 grams of chlorine over a period of 140 minutes at 55°C. and under normal pressure. The working up of the reaction mixture proceeded as in Example 1. The yield of N,N'-dichloroterephthalamide amounted to 522 grams (92% of theory).

EXAMPLE 5

Into a suspension of 5 grams (0.0305 mols) of terephthalamide in 200 ml. of a 10% by weight aqueous sulfuric acid solution there was conducted about 0.1 grams of chlorine per minute over a two hour period while mixing at normal pressure and a temperature of 25°C. The resulting N,N'-dichloro-terephthalamide was filtered off, washed with water and dried. The yield amounted to 6.94 grams (97.7% of theory).

EXAMPLE 6

64 grams (0.39 mols) of isophthalamide were suspended in one-half liter of a 15% by wt. aqueous hydrochloric acid solution. At room temperature and normal pressure, 90 grams of gaseous chlorine were conducted into this suspension under mixing over a period of 3 hours. Thereafter the reaction mixture was filtered, and the residue was washed with cold water and dried. The yield was 90 grams (99.0% of theory) of N,N'-dichloro-isophthalamide with a melting point of 73.5°–75°C.

EXAMPLE 7

16.4 grams (0.10 mols) of terephthalamide were suspended in 500 ml. of a 17% by wt. aqueous hydrochloric acid and heated in an enamel autoclave to 34°C. Then, by means of a dosing bulb, 22.8 grams (0.32 mols) of liquid chlorine was introduced under intensive mixing. A reaction temperature of 35°C. was maintained with cooling water. The reaction pressure amounted to 10 atm. After 5 minutes, the reaction suspension was rapidly degassed, withdrawn from the autoclave and filtered, and the residue was washed with 200 ml. of water. The residue was then dried under vacuum at 70°C. There resulted 22.6 grams (97% of theory) of N,N'-dichloroterephthalamide.

EXAMPLE 8

16.4 grams (0.10 mols) of terephthalamide were suspended in 500 ml. of a 17% by wt. aqueous hydrochloric acid solution and heated up quickly in an enamel autoclave to 45°C. Then, by means of a dosing flask or bulb, 23 grams (0.325 mols) of liquid chlorine were added under mixing and water cooling whereby over a 30 second interval the temperature rose to 55°C. and the pressure increased to 20 atm. After 3 minutes, the reaction mixture was withdrawn from the autoclave and filtered. The residue was washed with 200 ml. of water and then dried in a vacuum at 70°C. The yield amounted to 94% of theory.

The next five examples are concerned with production of m- and p-phenylenediamine from N,N'-dichloro-isophthalamide or N,N'-dichloro-terephthalamide, respectively, according to the second stage of the process of the present invention.

EXAMPLE 9

Into a 2 liter 3-necked flask under nitrogen, 100 grams (0.43 mols) of N,N'-dichloro-terephthalamide were stirred at 5°C. into 1.2 liters of caustic soda solution (1200 grams of water and 105 grams NaOH). The reaction mixture was then heated to 15°C. This resulted in a clear, colorless reaction solution.

This solution was then further heated. At 35°C., the exothermic rearrangement was initiated. Under adiabatic conditions, the temperature rose rapidly and reached 72°C. in about 2 minutes. The now light brown solution was left at this temperature for another 10 minutes and was then cooled and extracted with chloroform under a nitrogen atmosphere. After drawing off the chloroform from the extract, there was isolated 46 grams of p-phenylenediamine (99.0% of theory).

EXAMPLE 10

Into a 2 liter, 3-necked flask, provided with a reflux condenser, 100 grams (0.43 mols) of N,N'-dichloro-terephthalamide were stirred into 0.8 liters of caustic solution (800 g. $H_2O$ and 105 g. NaOH) at 5°C., and the mixture was then heated slowly to 15°C. Then, 400 ml. of methylene chloride were intensively admixed so as to produce an emulsion. The reaction mixture was further heated up to 37°C. and then removed from the hot water bath. The reaction began very vigorously as evidenced by the appearance of a heavy methylene chloride reflux. After about 10 minutes, the reaction was completed. The mixture was held for another 20 minutes at 38°C., the methylene chloride vaporized off and then the p-phenylenediamine isolated in the same manner as in Example 9. The yield amounted to 45.3 grams (97.3% of theory).

EXAMPLE 11

Analogous to Example 9, 50 grams (0.215 mols) of N,N'-dichloro-terephthalamide were suspended in 1 liter of water and admixed under cooling at 5°C. with 50 grams (0.67 mols) of $Ca(OH)_2$. This mixture was then heated up within about 10 minutes to 50°C. and left at this temperature for about 20 minutes after which the temperature was raised again and maintained for a further 30 minutes at 70°C. The resulting suspension was filtered hot and the filter residue was washed three times with 100 ml. of hot water each time. From the joined filtrate and wash water, it was possible to isolate and recover p-phenylenediamine by extraction with chloroform, i.e. according to the procedure followed in Example 9. The yield was 22 grams of p-phenylenediamine (94.7% of theory).

EXAMPLE 12

In the same manner as Example 9, 100 grams (0.43 mols) of N,N'-dichloro-terephthalamide were stirred into 1.2 liters of a potash solution (1200 grams water and 145 grams KOH), the reaction carried out and worked up to recover the product. There resulted 45.2 grams of p-phenylenediamine (97.3% of theory).

EXAMPLE 13

Again in the same manner as Example 9, 50 grams (0.215 mols) of N,N'-dichloro-isophthalamide were admixed at 5°C. with 800 ml. of caustic (800 grams $H_2O$ and 52 grams NaOH), and the mixture was then heated to 35°C. by means of a water bath. Through the release of the heat of reaction, the temperature rose within about 4 minutes to 60°C. The reaction product was maintained at this temperature for 15 minutes and the resulting m-phenylenediamine was isolated corresponding to the method of Example 9. The yield of the m-phenylenediamine amount to 22.3 grams (96.2% of theory).

The invention is hereby claimed as follows:

1. A process for the production of m-phenylenediamine or p-phenylenediamine from the corresponding isophthalamide or terephthalamide as the initial phthalamide reactant, which process comprises:

reacting chlorine with said phthalamide reactant suspended in water in a first stage while maintaining the resulting reaction mixture over the course of the reaction in said first stage as a dilute aqueous solution of a mineral acid, the dilution being such that hydrogen chloride being formed by the chlorination reaction remains substantially completely dissolved in the reaction mixture; and converting the resulting N,N'-dichloro-isophthalamide or N,N'-dichloro-terephthalamide of said first stage into the corresponding m-phenylenediamine or p-phenylenediamine by reaction with an aqueous solution of an alkali or alkaline earth metal hydroxide in a second stage.

2. A process as claimed in claim 1 wherein the first stage chlorination reaction is carried out at a temperature of about 0° to 100°C. and a pressure of about 1 to 20 atmospheres.

3. A process as claimed in claim 2 wherein the first stage reaction temperature is about 0° to 60°C.

4. A process as claimed in claim 1 wherein the first stage chlorination reaction is initiated in a neutral aqueous suspension of said phthalamide.

5. A process as claimed in claim 1 wherein the amount of said initial phthalamide reaction in said first stage chlorination reaction is about 20 to 400 grams per liter of the aqueous reaction mixture.

6. A process as claimed in claim 1 wherein the second stage conversion reaction is carried out at a temperature of about 20° to 95°C.

7. A process as claimed in claim 6 wherein the second stage reaction temperature is about 30° to 80°C.

8. A process as claimed in claim 6 wherein the concentration of the N,N'-dichloro-isophthalamide or N,N'-dichloroterephthalamide as the N,N'-dichloro-diamide reactant in said second stage conversion reaction is about 5 to 45% by weight of the aqueous reaction mixture.

9. A process as claimed in claim 8 wherein the molar ratio of hydroxide : N,N'-dichloro-diamide in said second stage reaction is about 6:1.

10. A process as claimed in claim 1 wherein the intermediate N,N'-dichloro-isophthalamide or N,N'-dichloro-terephthalamide product is first separated from the reaction mixture of the first stage and only then reacted with the alkali or alkaline earth metal hydroxide in said second stage.

\* \* \* \* \*